United States Patent
Fedeyko et al.

(10) Patent No.: US 8,101,146 B2
(45) Date of Patent: Jan. 24, 2012

(54) CATALYSTS FOR THE REDUCTION OF AMMONIA EMISSION FROM RICH-BURN EXHAUST

(75) Inventors: Joseph M. Fedeyko, Glen Mills, PA (US); Hai-Ying Chen, Conshohocken, PA (US); Arthur J. Reining, Christiana, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/083,154

(22) Filed: Apr. 8, 2011

(65) Prior Publication Data

US 2011/0182791 A1   Jul. 28, 2011

(51) Int. Cl.
*B01D 53/58* (2006.01)
*B01D 53/94* (2006.01)
*B01J 35/00* (2006.01)
*F01N 3/10* (2006.01)

(52) U.S. Cl. .......... 423/213.2; 423/213.7; 423/239.1; 423/247; 423/245.3; 423/237; 502/60; 502/345; 422/169; 422/170; 422/171; 422/172; 422/177; 60/299; 60/304

(58) Field of Classification Search ............... 423/213.2, 423/213.7, 239.1, 247, 245.3, 237; 502/60, 502/345; 422/169–172, 177; 60/299, 304
See application file for complete search history.

(56) References Cited

U.S. PATENT DOCUMENTS

| | | | |
|---|---|---|---|
| 5,168,085 A | 12/1992 | Addiego | |
| 7,481,983 B2 | 1/2009 | Patchett | |
| 7,601,662 B2 | 10/2009 | Bull | |
| 7,722,845 B2 | 5/2010 | Caudle | |
| 2007/0149394 A1 | 6/2007 | Fan | |
| 2008/0075646 A1* | 3/2008 | Mussmann et al. | ........ 423/213.2 |
| 2009/0087367 A1 | 4/2009 | Liu | |
| 2009/0126353 A1 | 5/2009 | Han | |
| 2010/0043402 A1 | 2/2010 | Perry | |
| 2010/0111791 A1 | 5/2010 | Caudle | |
| 2010/0186390 A1 | 7/2010 | Perry | |
| 2010/0290963 A1 | 11/2010 | Andersen | |

FOREIGN PATENT DOCUMENTS

| | | |
|---|---|---|
| WO | 2010004320 | 1/2010 |
| WO | 2010121257 | 10/2010 |

OTHER PUBLICATIONS

Mark Rosswurm et al., "An Experimental Assessment of the G8.3E Engine and Catalyst Emissions Performance", pp. 1-8, 2009.
R. Zukerman et al, "Modeling and Simulation of a Smart Catalytic Converter Combining NOx Storage, Ammonia Production and SCR", Chemical Engineering Journal 155 (2009), pp. 415-426.

* cited by examiner

*Primary Examiner* — Timothy Vanoy
(74) *Attorney, Agent, or Firm* — Jimmie Johnson

(57) ABSTRACT

A system for reducing ammonia ($NH_3$) emissions includes (a) a first component comprising a first substrate containing a three-way catalyst, wherein the first component is disposed upstream of a second component comprising a second substrate containing an ammonia oxidation catalyst, wherein said ammonia oxidation catalyst comprises a small pore molecular sieve supporting at least one transition metal; and (b) an oxygen-containing gas input disposed between the components. For example, a CHA Framework Type small pore molecular sieve may be used. A method for reducing $NH_3$ emission includes introducing an oxygen-containing gas into a gas stream to produce an oxygenated gas stream; and exposing the oxygenated gas stream to an $NH_3$ oxidation catalyst to selectively oxidize at least a portion of the $NH_3$ to $N_2$.

19 Claims, 7 Drawing Sheets

CATALYSTS FOR THE REDUCTION OF AMMONIA EMISSION FROM RICH-BURN EXHAUST

FIELD OF THE INVENTION

The present invention relates to small pore molecular sieve supported transition metal catalysts. The present invention further relates to systems which employ small pore molecular sieve supported transition metal catalysts for the reduction of ammonia ($NH_3$) from rich-burn exhaust.

BACKGROUND OF THE INVENTION

Typical engine exhaust is a heterogeneous mixture which contains, among other constituents, gaseous emissions such as carbon monoxide (CO), unburned or partially burned hydrocarbons or oxygenates thereof (HC) and nitrogen oxides ($NO_x$). Often, catalyst compositions and substrates on which the compositions are disposed are provided in engine exhaust systems to convert certain or all of these exhaust components to innocuous components. For example, three-way (TWC) catalysts are known to be suitably employed on stationary rich-burn engines to reduce the emissions of nitrogen oxides ($NO_x$), hydrocarbons (HC), and carbon monoxide (CO). Because these engines operate under rich conditions in which the air-to-fuel ratio has an amount of fuel that is greater than stoichiometric (i.e. the air-to-fuel ratio is below the stoichiometric ratio), a significant portion of the engine out $NO_x$ is converted to ammonia ($NH_3$) over the three-way catalysts and is consequently emitted as a secondary emission. For a typical rich-burn engine that is equipped with a TWC catalyst, the tailpipe $NH_3$ can be around 400 ppm.

A proven $NO_x$ abatement technology applied to stationary sources with lean exhaust conditions is Selective Catalytic Reduction (SCR). In this process, $NO_x$ is reduced with a reductant, such as ammonia ($NH_3$), to nitrogen ($N_2$) over a catalyst typically composed of base metals. SCR provides efficient conversions of $NO_x$ as long as the exhaust temperature is within the active temperature range of the catalyst. Reduction of $NO_x$ species to $N_2$ using $NH_3$ is of interest for meeting $NO_x$ emission targets in lean burn engines. A consequence of using $NH_3$ as a reductant is that under conditions of incomplete conversion or exhaust temperature upswings, $NH_3$ can slip from the exhaust of the vehicle. To avoid slippage of $NH_3$, a sub-stoichiometric quantity of $NH_3$ can be injected into the exhaust stream, but there will be decreased $NO_x$ conversion. Alternatively, the $NH_3$ can be overdosed into the system to increase $NO_x$ conversion rate, but the exhaust then needs to be further treated to remove excess or slipped $NH_3$. Even at a substoichiometric dosage of $NH_3$, an increase in exhaust temperature may release ammonia stored on the $NO_x$ abatement catalyst, giving an $NH_3$ slip. Conventional precious-metal based oxidation catalysts, such as platinum supported on alumina, can be very efficient at $NH_3$ removal above 225° C., but they produce considerable $N_2O$ and $NO_x$ as undesired side products instead of the desired $N_2$ product. Generally, the use of diesel engine catalysts for gasoline engines, stationary diesel or natural gas engines, results in the generation of $NH_3$ emissions since the catalyst is very active.

Two-staged systems which employ a staged $NO_x$ treatment-$NH_3$ treatment configuration are known in the industry. The catalysts employed by these systems, however, fail to achieve high selectivity of $NH_3$ to $N_2$ at temperatures above 400° C., where excessive oxidation of $NH_3$ to $NO_x$ can lead to the system exceeding $NO_x$ regulations. Additionally, the prior art systems typically relate to lean-burn engines that are operated above the stoichiometric ratio. Given this lean-burn condition, most of the prior art systems employ a catalyst for the selective catalyst reduction (SCR) of $NO_x$. SCR of $NO_x$ by nitrogenous compounds, such as ammonia or urea, has developed for numerous lean-burn applications including for treating industrial stationary applications, thermal power plants, gas turbines, coal-fired power plants, plant and refinery heaters and boilers in the chemical processing industry, furnaces, coke ovens, municipal waste plants and incinerators, and a number of vehicular (mobile) applications, e.g., for treating diesel exhaust gas. Similar to the known two-staged systems, however, known SCR catalysts and systems fail to achieve high selectivity of $NH_3$ to $N_2$ at temperatures above 400° C., where excessive oxidation of $NH_3$ to $NO_x$ can lead to the system exceeding $NO_x$ regulations.

Currently, there is no regulation on $NH_3$ emissions for exhaust from combustion systems because there is no technology commercially available to reduce the $NH_3$ emissions in such systems, while also meeting the stringent emission regulations for $NO_x$, HC, and CO. It would thus be useful to identify catalysts, and systems which employ the catalysts, which can minimize $NH_3$ emissions, for example below 10 ppm, while maintaining $NO_x$, HC, and CO emissions below existing regulations. Accordingly, a catalyst and system which reduces the emissions of nitrogen oxides ($NO_x$), hydrocarbons (HC), and carbon monoxide (CO) from the exhaust of a rich-burn engine operating at high temperatures, and which provides an $NH_3$ oxidation functionality to reduce the amount of $NH_3$ in the effluent, remains highly desirable.

SUMMARY OF THE INVENTION

According to an embodiment of the invention, a small pore molecular sieve catalyst is used as an ammonia oxidation catalyst (AOC) for rich-burn engine applications operating at high temperatures. We have found that catalysts comprising a small pore molecular sieve supporting at least one transition metal may be used in such applications for $NH_3$ oxidation with very high selectivity to $N_2$. Similar catalysts have previously been employed in lean burn applications for selective catalytic reduction (SCR) of $NO_x$ with $NH_3$. It is atypical, however, to utilize such catalysts as oxidation catalysts to oxidize $NH_3$ to form $N_2$ and $H_2O$. The inventors of the present invention, however, have found that $NH_3$ oxidation catalysts (AOC) including a small pore molecular sieve supporting at least one transition metal can be favorably employed, including in rich-burn engines operating at high temperatures or to treat other exhaust gases susceptible to allowing an undesirable amount of $NH_3$ slip. Novel systems and methods which employ such catalysts are provided herein.

According to one embodiment of the present invention, a system for reducing ammonia (NH3) emissions comprises: (a) a first component comprising a first substrate and a three-way catalyst disposed thereon, wherein the first component is disposed upstream of, and in fluid communication with, a second component comprising a second substrate and an ammonia oxidation catalyst disposed thereon, wherein said ammonia oxidation catalyst comprises a small pore molecular sieve supporting at least one transition metal; and (b) an oxygen-containing gas input disposed between said first and second components.

In a further embodiment of the present invention, the system additionally includes: (c) a first gaseous feed stream comprising exhaust gas derived from a rich-burn combustion process, wherein said feed stream is upstream of, and in fluid communication with, the first component; and (d) a conduit disposed between, and in fluid communication with, the first and second components and in fluid communication with said oxygen-containing gas input. In at least one embodiment, the small pore molecular sieve for $NH_3$ oxidation is a Cu-supported CHA Framework Type small pore molecular sieve, such as a Cu-supported SAPO-34.

In yet a further embodiment of the present invention, the AOC catalyst includes a small pore molecular sieve supporting a transition metal in the form of a first catalyst layer. In another embodiment, the AOC catalyst may include a second catalyst layer comprising a platinum group metal, wherein the first catalyst layer is disposed relative to the second catalyst layer such that the exhaust contacts the first catalyst layer before contacting the second catalyst layer. The platinum group metal may be, for example, ruthenium (Ru), rhodium (Rh), palladium (Pd), rhenium (Re), iridium (Ir) and platinum (Pt), and mixtures thereof. In at least one embodiment of the present invention, the small pore molecular sieve supporting transition metal in the first catalyst layer is Cu-supported CHA Framework Type small pore molecular sieve, such as a Cu-supported SAPO-34, and the platinum group metal in the second catalyst layer is Pt. When the second substrate has an inlet end, an outlet end, a length extending between the inlet end to the outlet end, wall elements extending along the length, and a plurality of passages defined by the wall elements, e.g., a flow through monolith, the AOC catalyst layer(s) may be disposed, for example, on the wall elements.

In another embodiment of the present invention, a method for reducing ammonia ($NH_3$) emission comprises: introducing an oxygen-containing gas into an exhaust gas having $NH_3$ and a lambda <1 to provide an oxygenated gas stream; and exposing the oxygenated gas stream to an $NH_3$ oxidation catalyst comprising at least one small pore molecular sieve supporting at least one transition metal to selectively oxidize at least a portion of the $NH_3$ to $N_2$. In yet another embodiment of the present invention, the method further comprises, upstream of the step of introducing an oxygen-containing gas, the step of: exposing a rich burn exhaust gas to a three-way catalyst for converting nitrogen oxides (NOx), hydrocarbons (HC), and carbon monoxide (CO) to produce the gas stream having $NH_3$ and a lambda <1. The oxygen-containing gas may be introduced to produce an oxygenated gas stream having an $O_2:NH_3$ ratio of at least about 1:1, preferably from about 2:1 to about 1:1. In at least one embodiment, the oxygen-containing gas comprises at least 0.1% oxygen, such as ambient air. The exposing step preferably occurs when rich burn exhaust gas is at a temperature of at least about 350° C., preferably in the range from about 400-650° C.

In still a further embodiment of the present invention, a catalyst article comprises: (a) a catalyst composition comprising (i) a small pore molecular sieve comprising a framework defining pores and having atomic sites; and (ii) at least one transition metal in atomic form disposed at at least one of said atomic sites and in oxide form residing freely in at least one of said pores; and (b) a substrate upon which said catalyst is disposed, wherein said catalyst article is adapted to oxidize ammonia generated by catalytic conversion of a rich burn exhaust gas. In at least one embodiment, the small pore molecular sieve is a copper (Cu) supported small pore molecular sieve having from about 0.1 to about 20.0 wt % copper to the total weight of the catalyst. In another embodiment, free copper is present in an amount sufficient to prevent hydrothermal degradation of the nitrogen oxide conversion of the catalyst. In at least one embodiment, the small pore molecular sieve is a Cu-supported CHA Framework Type small pore molecular sieve, such as a Cu-supported SAPO-34.

BRIEF DESCRIPTION OF THE DRAWINGS

In order that the invention may be more fully understood, reference is made to the following drawing by way of illustration only, in which.

DETAILED DESCRIPTION OF THE INVENTION

Figure 1:
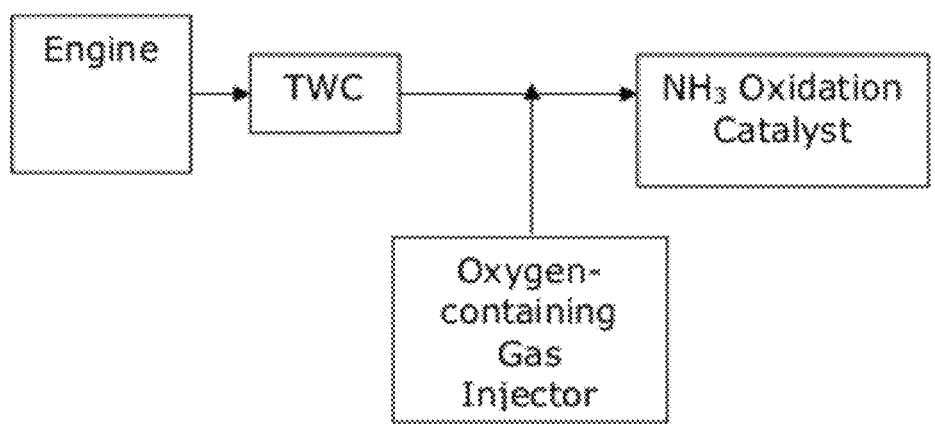
FIG. 1 is a system configuration according to one embodiment of the present invention.

It has now been identified that small pore molecular sieve supported transition metal catalysts can be utilized to selectively oxidize $NH_3$ to $N_2$. These catalysts retain good activity, excellent thermal stability, and durability after being exposed to a reducing atmosphere that is present in the exhaust of rich burn processes such as those encountered in gasoline engines and high power operation of gas turbines, coal-fired power plants, and the like. The medium and large pore molecular sieves, however, do not maintain their stability and activity when exposed to a reducing atmosphere possibly because of the effects of transition metal migration, sintering, and/or reduced transition metal dispersion. The methods of the present invention were found to be particularly effective in reducing $NH_3$ emissions from rich burn exhaust gas at high temperatures or of other exhaust gases having $NH_3$ and an excess of net reducing species (e.g., a lambda <1). In certain embodiments, the temperature of the rich burn exhaust gas being converted is at least about 350° C., and preferably in the range from about 400-650° C.

$NH_3$ may be generated by passing a rich burn exhaust gas over a three-way (TWC) catalyst. As used herein, a TWC catalyst is capable of simultaneously reducing the emission levels of nitrogen oxides ($NO_x$), hydrocarbons (HC), and carbon monoxide (CO) present in an engine exhaust gas, e.g., by converting at least a portion of such gases to $N_2$, $O_2$, $H_2O$, and $CO_2$. A TWC is defined as a catalyst consisting of a single layer, or multiple layers, of active catalyst materials (i.e., platinum group metal (PGM) or non-PGM), supported on a carrier material, which may or may not have additional additives to enhance specific catalyst activity (e.g., $H_2S$ suppression, $NO_x$ storage, HC storage) in the form of either a coated monolith or in extruded form. Combustion processes operating under rich conditions, that is in which the pre-combustion air-to-fuel ratio has an amount of fuel that is greater than stoichiometric (i.e. the air-to-fuel ratio is below the stoichiometric ratio), a significant portion of the exhausted $NO_x$ is converted to ammonia ($NH_3$) over the three-way catalysts which would normally be emitted as a secondary emission. The present invention relates to the use of an $NH_3$ oxidation catalyst, specifically a small pore molecular sieve supported transition metal catalyst, to selectively oxidize the $NH_3$ to $N_2$ and thereby reduce the level of $NH_3$ emission. Similar catalysts have been utilized in the treatment of lean-burn exhausts for reducing $NO_x$ using $NH_3$ as a reductant. Yet these catalyst have now been found to have surprising results as an $NH_3$ oxidation catalyst in the exhaust of rich burn engines operating at high temperatures. In the combined system, the AOC catalyst selectively oxidizes some or all of the $NH_3$ that slips through, or is produced by, the TWC catalyst during the normal rich operation conditions.

Compared to lean-burn conditions, a rich burn condition imposes additional requirements on a catalyst component. Namely, besides having good activity and excellent thermal stability, the AOC catalyst needs to be durable after being exposed to a reducing atmosphere at high temperature.

Air-to-fuel ratio (AFR) is the mass ratio of air to fuel present during combustion. If exactly enough air is provided to completely burn all of the fuel, the ratio is known as the stoichiometric mixture. Lambda ($\lambda$) is an alternative way to represent AFR. For gasoline fuel, which is ideally pure octane, the stoichiometric air-to-fuel mixture is approximately 14.7 (i.e., the approximate mass of air is 14.7 times the mass of fuel). Any mixture of this fuel less than 14.7 to 1 is considered to be a rich mixture, while any mixture more than 14.7 to 1 is considered a lean mixture. Most practical AFR devices actually measure the amount of residual oxygen (for lean mixes) or unburnt hydrocarbons (for rich mixtures) in the exhaust gas. Lambda ($\lambda$) is the ratio of actual AFR to stoichiometry for a given mixture and is a measure of the ratio of net oxidizing species to net reducing species of a gas. Lambda of 1.0 is at stoichiometry, rich mixtures have a lambda less than 1.0, and lean mixtures have a lambda greater than 1.0.

As used herein, a reducing atmosphere is net reducing, for example, an exhaust gas having a lambda value of less than 1 (e.g., derived from an air-to-fuel ratio less than stoichiometric). Contrastingly, a non-reducing atmosphere is net oxidizing, e.g., having a lambda value greater than 1 (e.g., derived from an air-to-fuel ratio greater than stoichiometric.

In at least one embodiment, the methods of the present invention include the step of introducing, for example by injecting, an oxygen-containing gas into the gas stream containing $NH_3$ to produce an oxygenated $NH_3$ gas stream. The oxygen-containing gas is preferably introduced at a rate sufficient to provide at least a minimum amount of oxygen for selective oxidation of the $NH_3$ to $N_2$ to reduce the amount of $NH_3$ to a desired level. In at least one embodiment, the oxygen-containing gas is introduced to produce an oxygenated gas stream having an $O_2:NH_3$ ratio of at least about 1:1, and preferably from about 2:1 to about 1:1. In at least one embodiment, the oxygen-containing gas comprises at least 0.1% oxygen, preferably at least 0.5% oxygen. While the oxygen-containing gas may contain any amount of oxygen above 0.5% oxygen, the amount of oxygen may range from 0.5% oxygen to 21% oxygen (i.e., ambient air) such that it is unnecessary to supplement the oxygen-containing gas with additional oxygen content. Other oxygen-containing gases may be used, such as oxygen in an inert gas, such as argon. As understood by one having ordinary skill in the art, the oxygen injection may adjust the lambda value of the gas stream containing $NH_3$ to be, for example, lean (i.e., have a lambda value of greater than 1).

The AOC catalyst comprises a small pore molecular sieve supporting at least one transition metal. Molecular sieves are typically defined by the member rings as follows: large pore rings are 12-member rings or larger; medium pore rings are 10-member rings; and small pore rings are 8-member rings or smaller. The small pore molecular sieve of the present invention preferably has a maximum ring size of eight tetrahedral atoms. As is used herein "molecular sieve" is understood to mean a metastable material containing tiny pores of a precise and uniform size. The molecular sieve framework may be defined as is generally acceptable by the International Zeolite Association framework type codes (at http://www.iza-online.org/). These molecular sieves are described in more detail below.

According to another embodiment of the invention, a system for reducing $NH_3$ emissions from rich-burn exhaust comprises: a first substrate comprising a three-way catalyst (TWC) for converting nitrogen oxides ($NO_x$), hydrocarbons (HC), and carbon monoxide (CO) from an engine exhaust; a means for introducing an oxygen-containing gas, such as an injector, wherein the gas is introduced downstream of the first substrate; and a second substrate comprising an $NH_3$ oxidation catalyst (AOC) downstream of the injector, wherein the $NH_3$ oxidation catalyst comprises at least one catalyst comprising a small pore molecular sieve supporting at least one transition metal. As would be appreciated by one having ordinary skill in the art, the terms "injected" and "injector" are not intended to limit the present invention to a specific apparatus or method of introducing the oxygen-containing gas. Any known apparatus or means for introducing the oxygen-containing gas may be utilized in view of the present invention.

FIG. 1 shows a system configuration according to such an embodiment of the present invention. The system configuration shown in FIG. 1 includes a first substrate 12 containing a TWC catalyst for converting, for example, $NO_x$, HC, and CO from the exhaust from an engine 10. An injector 14 is located such that it introduces an oxygen-containing gas at a point 16 downstream of TWC catalyst and upstream of a second substrate 18 containing an AOC catalyst. Injector 14 injects an oxygen-containing gas, such as air, into the $NH_3$ gas stream from TWC catalyst to produce an oxygenated $NH_3$ gas stream. As appreciated by one having ordinary skill in the art, first substrate 12 containing a TWC catalyst may not be necessary if the condition of the exhaust gas does not require emission reduction of particular pollutants such as $NO_x$, HC, and CO. Accordingly, in an alternative embodiment, the system may comprise an injector for injecting an oxygen-containing gas, such as air, into a gas stream containing $NH_3$, wherein the injector is located upstream of a second substrate containing an AOC catalyst. Preferably, the oxygen-containing gas introduced into the system is free, or substantially free, of ammonia or any precursor thereof, such as urea.

In certain exhaust gas conditions resulting from particular types of engines, the AOC catalyst may consist only of a small pore molecular sieve supporting at least one transition metal. Such a catalyst may be applicable, for example, in the system configuration for the emission reduction of a gasoline engine following a TWC catalyst or a stationary diesel engine. In this embodiment, the small pore molecular sieve supporting at least one transition metal may be in the form of a first catalyst layer. In other exhaust gas conditions resulting from other types of engines, the AOC catalyst may further include another type of catalyst. For example, in at least one embodiment, the AOC catalyst may further include a second catalyst layer comprising a platinum group metal (PGM), such that the first catalyst layer is disposed on top of, the second catalyst layer relative to exhaust gas flow through or past the catalyst. In such a configuration, the exhaust gas contacts the first catalyst layer before contacting the second catalyst layer. For example, the two catalysts may run along the length of a monolith, with the second catalyst layer being disposed below the first catalyst layer. Alternatively, the two catalysts may be disposed in series, with the first catalyst later being upstream of the second catalyst layer. In another embodiment, the first and second catalyst layers may overlap, for example by about 25%, about 50%, or about 75% of the length of at least one of the layers.

Such a multi-layer AOC catalyst may be utilized in, for example, natural gas-fired stationary engines. Natural gas-fired stationary engines are known to operate at rich conditions, and the second catalyst layer comprising a PGM may be utilized for carbon monoxide (CO) oxidation without oxidizing $NH_3$ to $NO_x$. Such a multi-layered catalyst may commonly be referred to as an ammonia-slip catalyst (ASC) as it has a PGM catalyst under-layer and a catalyst for selective $NH_3$ oxidation as a top-layer. In such a configuration, a sufficient amount of the top-layer catalyst is used to selectively oxidize $NH_3$ to $N_2$ such that a tolerable or no amount of $NH_3$ reaches the PGM catalyst under-layer to cause over-oxidation to form $NO_x$. In at least one embodiment of the present invention, the ratio of the top-layer catalyst to the under-layer catalyst is from about 0.5:1 to about 10:1, and more preferably from about 2:1 to about 7:1.

As would be appreciated by one having ordinary skill in the art, such multi-layered catalysts may have other configurations and may be employed in a myriad of ways. For example, when the second substrate containing the AOC catalyst has an inlet end, an outlet end, a length extending between the inlet end to the outlet end, wall elements extending along the length, and a plurality of passages defined by the wall elements, the multi-layered AOC catalyst may be disposed on the wall elements. Examples of substrates include flow-through honeycomb monoliths and wall-flow honeycomb monoliths. The platinum group metal may be, for example, ruthenium (Ru), rhodium (Rh), palladium (Pd), rhenium (Re), iridium (Ir) and platinum (Pt), and mixtures thereof. Typical supports may be used such as, for example, alumina, zirconia, ceria, etc.

According to another embodiment of the present invention, a method for reducing ammonia ($NH_3$) emission comprises: introducing an oxygen-containing gas into an exhaust gas having $NH_3$ and a lambda <1 to provide an oxygenated gas stream; and exposing the oxygenated gas stream to an $NH_3$ oxidation catalyst comprising at least one small pore molecular sieve supporting at least one transition metal to selectively oxidize at least a portion of the $NH_3$ to $N_2$. In yet another embodiment of the present invention, the method further comprises, upstream of the step of introducing an oxygen-containing gas, the step of: exposing a rich burn exhaust gas to a three-way catalyst for converting nitrogen oxides ($NO_x$), hydrocarbons (HC), and carbon monoxide (CO) to produce a gas stream comprising $NH_3$ and a lambda <1. The oxygen-containing gas may be introduced to produce an oxygenated gas stream having an $O_2:NH_3$ ratio of at least about 1:1, preferably from about 2:1 to about 1:1. In at least one embodiment, the oxygen-containing gas comprises at least 0.1% oxygen, such as ambient air. The exposing step preferably occurs when rich burn exhaust gas is at a temperature of at least about 350° C., preferably in the range from about 400-650° C. The oxygen-containing gas is injected at a rate sufficient to provide at least a minimum amount of oxygen for selective oxidation of the $NH_3$ to $N_2$ to reduce the amount of $NH_3$ to a desired level. Thus, the amount of oxygen introduced preferably produces an oxygenated gas stream having an $O_2:NH_3$ ratio of at least about 1:1, preferably from about 2:1 to about 1:1, and a lambda value of greater than 1.

It will be appreciated that, by defining the molecular sieve by their Framework Type Codes (FTC), we intend to include the "Type Material" and any and all isotypic framework materials defined by that FTC. (The "Type Material" is the species first used to establish the framework type.) Reference is made to Table 1, which lists a range of illustrative molecular sieve materials for use in the present invention. For the avoidance of doubt, unless otherwise made clear, reference herein to a molecular sieve by name, e.g. "chabazite", is to the molecular sieve material per se (in this example the naturally occurring type material chabazite) and not to any other material designated by the Framework Type Code to which the individual molecular sieve may belong, e.g. some other isotypic framework material.

The distinction between molecular sieve type materials, such as naturally occurring (i.e. mineral) chabazite, and isotypes within the same Framework Type Code is not merely arbitrary, but reflects differences in the properties between the materials, which may in turn lead to differences in activity in the method of the present invention. It will be appreciated, e.g. from Table 1 hereinbelow, that by "MeAPSO" and "MeAlPO" we intend zeotypes substituted with one or more metals. Suitable substituent metals include one or more of, without limitation, As, B, Be, Co, Fe, Ga, Ge, Li, Mg, Mn, Zn, Cu, Ti, Sn, In, and Zr.

In a particular embodiment, the small pore molecular sieve catalysts for use in the present invention can be selected from the group consisting of aluminosilicate molecular sieves, metal-substituted aluminosilicate molecular sieves and aluminophosphate molecular sieves. Aluminophosphate molecular sieves with application in the present invention include aluminophosphate (AlPO) molecular sieves, metal substituted (MeAlPO) molecular sieves, silico-aluminophosphate (SAPO) molecular sieves and metal substituted silico-aluminophosphate (MeAPSO) molecular sieves.

In one embodiment, the small pore molecular sieve is selected from the group of Framework Types consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. In a further embodiment, the small pore molecular sieve containing a maximum ring size of eight tetrahedral atoms is selected from the group of Framework Types consisting of CHA, LEV, ERI, AEI, UFI, and DDR, and mixtures and/or intergrowths thereof. In yet another embodiment, the small pore molecular sieve comprises a CHA Framework Type. As will be discussed below, in at least one embodiment the small pore molecular sieve of the present invention supports at least one transition metal, such as copper. A preferred copper-containing three dimensional small pore molecular sieve/aluminophosphate molecular sieve for use in the present invention consists of Cu/CHA, such as Cu/SAPO-34. In a multi-layer AOC catalyst, as described above, a preferred AOC catalyst includes a Cu-supported CHA Framework Type small pore molecular sieve, such as SAPO-34, as the small pore molecular sieve supporting the at least one transition metal in the first catalyst top-layer, and Pt as the platinum group metal in the second catalyst under-layer.

Molecular sieves with application in the present invention can include those that have been treated to improve hydrothermal stability. Illustrative methods of improving hydrothermal stability include:

(i) Dealumination by: steaming and acid extraction using an acid or complexing agent e.g. (EDTA—ethylenediaminetetracetic acid); treatment with acid and/or complexing agent; treatment with a gaseous stream of $SiCl_4$ (replaces Al in the molecular sieve framework with Si);

(ii) Cation exchange—use of multi-valent cations such as La; and (iii) Use of phosphorus containing compounds (see, e.g., U.S. Pat. No. 5,958,818).

Illustrative examples of suitable small pore molecular sieves are set out in Table 1.

TABLE 1

| | Small Pore Molecular Sieve | | | |
|---|---|---|---|---|
| Molecular Sieve Framework Type (by Framework Type Code) | Type material* and illustrative isotypic framework structures | Dimensionality | Pore size (Å) | Additional info |
| ACO | *ACP-1 | 3D | 3.5 × 2.8, 3.5 × 3.5 | Ring sizes - 8, 4 |
| AEI | *AlPO-18 | 3D | 3.8 × 3.8 | Ring sizes - 8, 6, 4 |
| | [Co—Al—P—O]-AEI SAPO-18 SIZ-8 SSZ-39 | | | |
| AEN | *AlPO-EN3 | 2D | 4.3 × 3.1, 2.7 × 5.0 | Ring sizes - 8, 6, 4 |
| | AlPO-53(A) AlPO-53(B) [Ga—P—O]-AEN CFSAPO-1A CoIST-2 IST-2 JDF-2 MCS-1 MnAPO-14 Mu-10 UiO-12-500 UiO-12-as | | | |
| AFN | *AlPO-14 | 3D | 1.9 × 4.6, 2.1 × 4.9, 3.3 × 4.0 | Ring sizes - 8, 6, 4 |
| | |($C_3N_2H_{12}$)—|[Mn—Al—P—O]-AFN GaPO-14 | | | |
| AFT | *AlPO-52 | 3D | 3.8 × 3.2, 3.8 × 3.6 | Ring sizes - 8, 6, 4 |
| AFX | *SAPO-56 | 3D | 3.4 × 3.6 | Ring sizes - 8, 6, 4 |
| | MAPSO-56, M = Co, Mn, Zr SSZ-16 | | | |
| ANA | *Analcime | 3D | 4.2 × 1.6 | Ring sizes - 8, 6, 4 |
| | $AlPO_4$-pollucite AlPO-24 Ammonioleucite [Al—Co—P—O]-ANA [Al—Si—P—O]-ANA |Cs—|[Al—Ge—O]-ANA |Cs—|[Be—Si—O]-ANA |$Cs_{16}$|[$Cu_8Si_{40}O_{96}$]-ANA |Cs—Fe|[Si—O]-ANA |Cs—Na—($H_2O$)|[Ga—Si—O]-ANA [Ga—Ge—O]-ANA |K—|[B—Si—O]-ANA |K—|[Be—B—P—O]-ANA |Li—|[Li—Zn—Si—O]-ANA |Li—Na|[Al—Si—O]-ANA |Na—|[Be—B—P—O]-ANA |($NH_4$)—|[Be—B—P—O]-ANA |($NH_4$)—|[Zn—Ga—P—O]-ANA [Zn—As—O]-ANA Ca-D | | | |

TABLE 1-continued

| Small Pore Molecular Sieve | | | | |
|---|---|---|---|---|
| Molecular Sieve Framework Type (by Framework Type Code) | Type material* and illustrative isotypic framework structures | Dimensionality | Pore size (Å) | Additional info |
| | Hsianghualite | | | |
| | Leucite | | | |
| | Na—B | | | |
| | Pollucite | | | |
| | Wairakite | | | |
| ARC | *AlPO—C | 2D | 3.7 × 3.4, 4.7 × 2.0 | Ring sizes - 8, 6, 4 |
| | AlPO—H3 | | | |
| | CoAPO-H3 | | | |
| APD | *AlPO—D | 2D | 6.0 × 2.3, 5.8 × 1.3 | Ring sizes - 8, 6, 4 |
| | APO-CJ3 | | | |
| ATT | *AlPO-12-TAMU | 2D | 4.6 × 4.2, 3.8 × 3.8 | Ring sizes - 8, 6, 4 |
| | AlPO-33 | | | |
| | RMA-3 | | | |
| CDO | *CDS-1 | 2D | 4.7 × 3.1, 4.2 × 2.5 | Ring sizes - 8, 5 |
| | MCM-65 | | | |
| | UZM-25 | | | |
| CHA | *Chabazite | 3D | 3.8 × 3.8 | Ring sizes - 8, 6, 4 |
| | AlPO-34 | | | |
| | [Al—As—O]-CHA | | | |
| | [Al—Co—P—O]-CHA | | | |
| | \|Co\| [Be—P—O]-CHA | | | |
| | \|Co$_3$(C$_6$N$_4$H$_{24}$)$_3$(H$_2$O)$_9$\| [Be$_{18}$P$_{18}$O$_{72}$]-CHA | | | |
| | [Co—Al—P—O]-CHA | | | |
| | \|Li—Na\| [Al—Si—O]-CHA | | | |
| | [Mg—Al—P—O]-CHA | | | |
| | [Si—O]-CHA | | | |
| | [Zn—Al—P—O]-CHA | | | |
| | [Zn—As—O]-CHA | | | |
| | CoAPO-44 | | | |
| | CoAPO-47 | | | |
| | DAF-5 | | | |
| | GaPO-34 | | | |
| | K-Chabazite | | | |
| | Linde D | | | |
| | Linde R | | | |
| | LZ-218 | | | |
| | MeAPO-47 | | | |
| | MeAPSO-47 | | | |
| | (Ni(deta)$_2$)-UT-6 | | | |
| | Phi | | | |
| | SAPO-34 | | | |
| | SAPO-47 | | | |
| | SSZ-13 | | | |
| | UiO-21 | | | |
| | Willhendersonite | | | |
| | ZK-14 | | | |
| | ZYT-6 | | | |
| DDR | *Deca-dodecasil 3R | 2D | 4.4 × 3.6 | Ring sizes - 8, 6, 5, 4 |
| | [B—Si—O]-DDR | | | |
| | Sigma-1 | | | |
| | ZSM-58 | | | |
| DFT | *DAF-2 | 3D | 4.1 × 4.1, 4.7 × 1.8 | Ring sizes - 8, 6, 4 |
| | ACP-3, [Co—Al—P—O]-DFT | | | |
| | [Fe—Zn—P—O]-DFT | | | |
| | [Zn—Co—P—O]-DFT | | | |
| | UCSB-3GaGe | | | |
| | UCSB-3ZnAs | | | |
| | UiO-20, [Mg—P—O]-DFT | | | |
| EAB | *TMA-E | 2D | 5.1 × 3.7 | Ring sizes - 8, 6, 4 |
| | Bellbergite | | | |

TABLE 1-continued

| Small Pore Molecular Sieve | | | | |
|---|---|---|---|---|
| Molecular Sieve Framework Type (by Framework Type Code) | Type material* and illustrative isotypic framework structures | Dimensionality | Pore size (Å) | Additional info |
| EDI | *Edingtonite | 3D | 2.8 × 3.8, 3.1 × 2.0 | Ring sizes - 8, 4 |
| | $\|(C_3H_{12}N_2)_{2.5}\|$ $[Zn_5P_5O_{20}]$-EDI $[Co—Al—P—O]$-EDI $[Co—Ga—P—O]$-EDI $\|Li—\|[Al—Si—O]$-EDI $\|Rb_7Na(H_2O)_3\|$ $[Ga_8Si_{12}O_{40}]$-EDI $[Zn—As—O]$-EDI K—F Linde F Zeolite N | | | |
| EPI | *Epistilbite | 2D | 4.5 × 3.7, 3.6 × 3.6 | Ring sizes - 8, 4 |
| ERI | *Erionite | 3D | 3.6 × 5.1 | Ring sizes - 8, 6, 4 |
| | AlPO-17 Linde T LZ-220 SAPO-17 ZSM-34 | | | |
| GIS | *Gismondine | 3D | 4.5 × 3.1, 4.8 × 2.8 | Ring sizes - 8, 4 |
| | Amicite $[Al—Co—P—O]$-GIS $[Al—Ge—O]$-GIS $[Al—P—O]$-GIS $[Be—P—O]$-GIS $\|(C_3H_{12}N_2)_4\|$ $[Be_8P_8O_{32}]$-GIS $\|(C_3H_{12}N_2)_4\|$ $[Zn_8P_8O_{32}]$-GIS $[Co—Al—P—O]$-GIS $[Co—Ga—P—O]$-GIS $[Co—P—O]$-GIS $\|Cs_4\|[Zn_4B_4P_8O_{32}]$-GIS $[Ga—Si—O]$-GIS $[Mg—Al—P—O]$-GIS $\|(NH_4)_4\|[Zn_4B_4P_8O_{32}]$-GIS $\|Rb_4\|[Zn_4B_4P_8O_{32}]$-GIS $[Zn—Al—As—O]$-GIS $[Zn—Co—B—P—O]$-GIS $[Zn—Ga—As—O]$-GIS $[Zn—Ga—P—O]$-GIS Garronite Gobbinsite MAPO-43 MAPSO-43 Na—P1 Na—P2 SAPO-43 TMA-gismondine | | | |
| GOO | *Goosecreekite | 3D | 2.8 × 4.0, 2.7 × 4.1, 4.7 × 2.9 | Ring sizes - 8, 6, 4 |
| IHW | *ITQ-32 | 2D | 3.5 × 4.3 | Ring sizes - 8, 6, 5, 4 |
| ITE | *ITQ-3 | 2D | 4.3 × 3.8, 2.7 × 5.8 | Ring sizes - 8, 6, 5, 4 |
| | Mu-14 SSZ-36 | | | |
| ITW | *ITQ-12 | 2D | 5.4 × 2.4, 3.9 × 4.2 | Ring sizes - 8, 6, 5, 4 |
| LEV | *Levyne | 2D | 3.6 × 4.8 | Ring sizes - 8, 6, 4 |
| | AlPO-35 CoDAF-4 LZ-132 NU-3 RUB-1 [B—Si—O]-LEV | | | |

TABLE 1-continued

| Small Pore Molecular Sieve | | | | |
|---|---|---|---|---|
| Molecular Sieve Framework Type (by Framework Type Code) | Type material* and illustrative isotypic framework structures | Dimensionality | Pore size (Å) | Additional info |
| KFI | SAPO-35<br>ZK-20<br>ZnAPO-35<br>ZK-5 | 3D | 3.9 × 3.9 | Ring sizes - 8, 6, 4 |
|  | \|18-crown-6\|[Al—Si—O]-KFI<br>[Zn—Ga—As—O]-KFI<br>(Cs,K)-ZK-5<br>P<br>Q |  |  |  |
| MER | *Merlinoite | 3D | 3.5 × 3.1, 3.6 × 2.7, 5.1 × 3.4, 3.3 × 3.3 | Ring sizes - 8, 4 |
|  | [Al—Co—P—O]-MER<br>\|Ba—\|[Al—Si—O]-MER<br>\|Ba—Cl—\|[Al—Si—O]-MER<br>[Ga—Al—Si—O]-MER<br>\|K—\|[Al—Si—O]-MER<br>\|NH$_4$—\|[Be—P—O]-MER<br>K-M<br>Linde W<br>Zeolite W |  |  |  |
| MON | *Montesommaite | 2D | 4.4 × 3.2, 3.6 × 3.6 | Ring sizes - 8, 5, 4 |
|  | [Al—Ge—O]-MON |  |  |  |
| NSI | *Nu-6(2) | 2D | 2.6 × 4.5, 2.4 × 4.8 | Ring sizes - 8, 6, 5 |
|  | EU-20 |  |  |  |
| OWE | *UiO-28 | 2D | 4.0 × 3.5, 4.8 × 3.2 | Ring sizes - 8, 6, 4 |
|  | ACP-2 |  |  |  |
| PAU | *Paulingite | 3D | 3.6 × 3.6 | Ring sizes - 8, 6, 4 |
|  | [Ga—Si—O]-PAU<br>ECR-18 |  |  |  |
| PHI | *Phillipsite | 3D | 3.8 × 3.8, 3.0 × 4.3, 3.3 × 3.2 | Ring sizes - 8, 4 |
|  | [Al—Co—P—O]-PHI<br>DAF-8<br>Harmotome<br>Wellsite<br>ZK-19 |  |  |  |
| RHO | *Rho | 3D | 3.6 × 3.6 | Ring sizes - 8, 6, 4 |
|  | [Be—As—O]-RHO<br>[Be—P—O]-RHO<br>[Co—Al—P—O]-RHO<br>\|H—\|[Al—Si—O]-RHO<br>[Mg—Al—P—O]-RHO<br>[Mn—Al—P—O]-RHO<br>\|Na$_{16}$Cs$_8$\|<br>[Al$_{24}$Ge$_{24}$O$_{96}$]-RHO<br>\|NH$_4$—\|[Al—Si—O]-RHO<br>\|Rb—\|[Be—As—O]-RHO<br>Gallosilicate ECR-10<br>LZ-214<br>Pahasapaite |  |  |  |
| RTH | *RUB-13 | 2D | 4.1 × 3.8, 5.6 × 2.5 | Ring sizes - 8, 6, 5, 4 |
|  | SSZ-36<br>SSZ-50 |  |  |  |
| SAT | *STA-2 | 3D | 5.5 × 3.0 | Ring sizes - 8, 6, 4 |
| SAV | *Mg-STA-7 | 3D | 3.8 × 3.8, 3.9 × 3.9 | Ring sizes - 8, 6, 4 |
|  | Co-STA-7<br>Zn-STA-7 |  |  |  |
| SBN | *UCSB-9 | 3D | TBC | Ring sizes - 8, 4, 3 |
|  | SU-46 |  |  |  |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| SIV | *SIZ-7 | 3D | 3.5 × 3.9, 3.7 × 3.8, 3.8 × 3.9 | Ring sizes - 8, 4 |
| THO | *Thomsonite | 3D | 2.3 × 3.9, 4.0 × 2.2, 3.0 × 2.2 | Ring sizes - 8, 4 |
|  | [Al—Co—P—O]-THO |  |  |  |
|  | [Ga—Co—P—O]-THO |  |  |  |
|  | \|Rb$_{20}$\|[Ga$_{20}$Ge$_{20}$O$_{80}$]-THO |  |  |  |
|  | [Zn—Al—As—O]-THO |  |  |  |
|  | [Zn—P—O]-THO |  |  |  |
|  | [Ga—Si—O]-THO) |  |  |  |
|  | [Zn—Co—P—O]-THO |  |  |  |
| TSC | *Tsch#e,uml;o#ee;rtnerite | 3D | 4.2 × 4.2, 5.6 × 3.1 | Ring sizes - 8, 6, 4 |
| UEI | *Mu-18 | 2D | 3.5 × 4.6, 3.6 × 2.5 | Ring sizes - 8, 6, 4 |
| UFI | *UZM-5 | 2D | 3.6 × 4.4, 3.2 × 3.2 (caqe) | Ring sizes - 8, 6, 4 |
| VNI | *VPI-9 | 3D | 3.5 × 3.6, 3.1 × 4.0 | Ring sizes - 8, 5, 4, 3 |
| YUG | *Yugawaralite | 2D | 2.8 × 3.6, 3.1 × 5.0 | Ring sizes - 8, 5, 4 |
|  | Sr-Q |  |  |  |
| ZON | *ZAPO-M1 | 2D | 2.5 × 5.1, 3.7 × 4.4 | Ring sizes - 8, 6, 4 |
|  | GaPO-DAB-2 |  |  |  |
|  | UiO-7 |  |  |  |

Small pore molecular sieves with particular application for NH$_3$ oxidation are set out in Table 2.

TABLE 2

Preferred Small Pore Molecular Sieves.

| Structure | Molecular Sieve |
|---|---|
| CHA | SAPO-34 |
|  | AlPO-34 |
|  | SSZ-13 |
| LEV | Levynite |
|  | Nu-3 |
|  | LZ-132 |
|  | SAPO-35 |
|  | ZK-20 |
| ERI | Erionite |
|  | ZSM-34 |
|  | Linde type T |
| DDR | Deca-dodecasil 3R |
|  | Sigma-1 |
| KFI | ZK-5 |
|  | 18-crown-6 |
|  | [Zn—Ga—As—O]-KFI |
| EAB | TMA-E |
| PAU | ECR-18 |
| MER | Merlinoite |
| AEI | SSZ-39 |
| GOO | Goosecreekite |
| YUG | Yugawaralite |
| CIS | P1 |
| VNI | VPI-9 |
| AEI | SAPO-18 |

Molecular sieves for use in the present application include natural and synthetic molecular sieves, preferably synthetic molecular sieves because the molecular sieves can have a more uniform: silica-to-alumina ratio (SAR), crystallite size, crystallite morphology, and the absence of impurities (e.g. alkaline earth metals). Small pore aluminosilicate molecular sieves may have a silica-to-alumina ratio (SAR) of from 2 to 300, optionally 4 to 200, and preferably 8 to 150. It will be appreciated that any SAR ratio may be selected to improve thermal stability, but this may adversely affect transition metal exchange.

Small pore molecular sieves for use in the invention may have three-dimensional dimensionality, i.e. a pore structure which is interconnected in all three crystallographic dimensions, or two-dimensional dimensionality. In one embodiment, the small pore molecular sieves for use in the present invention consist of molecular sieves having three-dimensional dimensionality. In another embodiment, the small pore molecular sieves for use in the present invention consist of molecular sieves having two-dimensional dimensionality.

In certain embodiments, the small pore molecular sieve comprises, consists essentially of, or consists of a disordered framework selected from the group consisting of ABC-6, AEI/CHA, AEI/SAV, AEN/UEI, AFS/BPH, BEC/ISV, beta, fuajasite, ITE/RTH, KFI/SAV, lovdarite, montesommaite, MTT/TON, pentasils, SBS/SBT, SSF/STF, SSZ-33, and ZSM-48. In a preferred embodiment, one or more of the small pore molecular sieves may comprise a CHA Framework Type selected from SAPO-34, AlPO-34, SAPO-47, ZYT-6, CAL-1, SAPO-40, SSZ-62 or SSZ-13 and/or an AEI Framework Type of selected from AlPO-18, SAPO-18, SIZ-8, or SSZ-39. In one embodiment, the mixed phase composition is an AEI/CHA-mixed phase composition. The ratio of each framework type in the molecular sieve is not particularly limited. For example, the ratio of AEI/CHA may range from about 5/95 to about 95/5, preferably about 60/40 to 40/60. In an exemplary embodiment, the ratio of AEI/CHA may range from about 5/95 to about 40/60.

In at least one embodiment of the present invention, the small pore molecular sieve is a support for one or more transition metals. As used herein, the at least one transition metal is defined to include one or more of chromium (Cr), manganese (Mn), iron (Fe), cobalt (Co), cerium (Ce), nickel (Ni), copper (Cu), zinc (Zn), gallium (Ga), molybdenum (Mo), silver (Ag), indium (In), ruthenium (Ru), rhodium (Rh), palladium (Pd), rhenium (Re), iridium (Ir), platinum (Pt), and tin (Sn), and mixtures thereof. Preferably, the one or more transition metals may be chromium (Cr), cerium (Ce), manganese (Mn), iron (Fe), cobalt (Co), nickel (Ni), and copper (Cu), and mixtures thereof, and most preferably copper. As known to one having ordinary skill in the art, a transition metal, such as copper, may be exchanged with the alumina within the framework of the small pore molecular sieve to produce a small pore molecular sieve supported transition metal catalyst.

Transition metal loading has been found to improve the performance of the catalysts in accordance with embodiments of the present invention. As would be appreciated by one having ordinary skill in the art, a carrier catalyst, such as a molecular sieve, may be loaded with a transition metal in a number of ways. The transition metal can be, for example, exchanged with atomic constituents at atomic exchange sites in the structure of the molecular sieve. Additionally, or alternatively, the transition metal may be present in the molecular sieve as non-exchanged transition metals in salt form, for example, within the pores of the molecular sieve. Upon calcination, the non-exchanged transition metal salt decomposes to form a transition metal oxide, which may be referred to as "free metal." Non-exchanged transition metal may be present in the molecular sieve when the transition metal loading exceeds the saturation limit of the atomic exchange sites (i.e., all of the exchange sites have been exchanged). While such high transition metal loadings may be employed in the $NH_3$ oxidation application of the present invention, such loadings would be contrary to standard SCR applications because the oxidizing effect of the transition metal would compete with the reduction reaction. For example, when copper is utilized as the transition metal, copper oxides may be present in the pores of the molecular sieve as "free copper." This free copper or metal is both active and selective, and has now also been found to impart greater stability in catalysts subjected to thermal aging at high temperatures.

As would be understood by one having ordinary skill in the art, the total amount of the transition metal that can be included in the molecular sieve may depend on a number of factors including, for example, the type and acidity of the molecular sieve utilized. The total amount of the transition metal that can be included in the molecular sieve may have a maximum of one metal atom per acid site, with a preferable metal to acid site ratio from about 0.02:1 to about 1:1, as measured by a typical $NH_3$ absorption method known in the art. The amount of transition metal may also depend, for example, on whether the AOC is utilized as a single-layer catalyst or as a multiple-layer catalyst, such as when a small pore molecular sieve supported transition metal catalyst is employed as a top-layer over an under-layer of a platinum group metal catalyst. The copper may be included in the molecular sieve by any feasible method. For example, it can be added after the molecular sieve has been synthesized, e.g., by incipient wetness or exchange process; or can be added during molecular sieve synthesis.

In still a further embodiment of the present invention, a catalyst article comprises: (a) a catalyst composition comprising (i) a small pore molecular sieve comprising a framework defining pores and having atomic sites; and (ii) at least one transition metal in atomic form disposed at at least one of said atomic sites and in oxide form residing freely in at least one of said pores; and (b) a substrate upon which said catalyst is disposed, wherein said catalyst article is adapted to oxidize ammonia generated by catalytic conversion of a rich burn exhaust gas. In yet another embodiment, free transition metal, such as free copper, is present in an amount sufficient to prevent hydrothermal degradation of the nitrogen oxide conversion of the catalyst. Without being held to any theory, it is believed that transition metals at low loadings (i.e., below some saturation limit) is exchanged with the atomic sites in the framework. When an amount of transition metal is added above this saturation limit, the remaining transition metal is present in the catalyst in the form of free transition metal (i.e., transition metal oxide).

In at least one embodiment of the present invention, the small pore molecular sieve is a small pore molecular sieve supported copper catalyst of the CHA Framework Type. A preferred copper-containing three dimensional small pore molecular sieve/aluminophosphate molecular sieve for use in the present invention consists of Cu/CHA, such as Cu/SAPO-34. When Cu/SAPO-34 is utilized as the small pore molecular sieve supported transition metal catalyst in a single-layer catalyst, the total amount of copper metal can be from 0.01 to 20 wt %, preferably from 2 to 8 wt %, and most preferably from 2.5 to 6 wt %, based on the total weight of the catalyst. When Cu/SAPO-34 is utilized as the small pore molecular sieve supported transition metal catalyst in a multiple-layer catalyst, the total amount of copper metal can be from 0.01 to 20 wt %, preferably from 0.2 to 4 wt %, and most preferably from 0.5 to 3 wt %, based on the total weight of the catalyst. In another embodiment, free copper is present in an amount sufficient to prevent hydrothermal degradation of the nitrogen oxide conversion of the catalyst. As would be appreciated by one having ordinary skill in the art and as stated above, however, the total amount of the transition metal that can be included in the molecular sieve may depend on a number of factors including, for example, the type and acidity of the molecular sieve utilized and the number of catalyst layers.

The catalysts (including both the molecular sieve catalyst and the PGM catalyst) for use in the present invention can be coated on a suitable substrate monolith or can be formed as extruded-type catalysts. In one embodiment, the catalyst is coated on a flow-through monolith substrate (i.e. a honeycomb monolithic catalyst support structure with many small, parallel channels running axially through the entire part) or wall-flow filter, such as a wall-flow filter. The catalyst for use in the present invention can be coated, e.g., as a washcoat component, on a suitable monolith substrate, such as a metal or ceramic flow through monolith substrate or a filtering substrate, such as a wall-flow filter or sintered metal or partial filter (such as is disclosed in WO 01/80978 or EP 1057519, the latter document describing a substrate comprising convoluted flow paths that at least slows the passage of soot therethrough). Alternatively, the catalyst for use in the present invention can be synthesized directly onto the substrate. Alternatively, the catalysts according to the invention can be formed into an extruded-type flow through catalyst. Such extruded-type catalysts may be formed as catalyst canisters. The extruded AOC catalyst canisters may be formed as single-layer or multi-layer AOC catalyst canisters individually, or in conjunction with a TWC catalyst canister. Other forms, such as pellets, beads, or other shaped catalysts are possible.

Washcoat compositions containing the small pore molecular sieve supported transition metal catalysts of the present invention for coating onto the substrate can comprise other constituents known to one having ordinary skill in the art. For example, such washcoat compositions may additionally comprise a binder selected from the group consisting of alumina, silica, (non molecular sieve) silica-alumina, naturally occurring clays, $TiO_2$, $ZrO_2$, $CeO_2$, and $SnO_2$, and mixtures and combinations thereof. The catalyst compositions may first be prepared as a slurry and applied to the substrate as a washcoat slurry composition using any known method.

The method of the present invention may be performed on a gas derived from a combustion process, such as from an internal combustion engine (whether mobile or stationary), a gas turbine and coal, oil, or natural gas-fired plants or engines. The method may also be used to treat gas from industrial processes such as refining, from refinery heaters and boilers, furnaces, the chemical processing industry, coke ovens, municipal waste plants and incinerators, coffee roasting plants, etc. In a particular embodiment, the method is used for treating exhaust gas from a vehicular internal combustion engine with a rich condition, such as a gasoline engine, or from a stationary engine powered by liquid petroleum gas or natural gas.

The entire contents of any and all patents and references cited herein are incorporated herein by reference.

EXAMPLES

The following examples are illustrative but not limiting of the invention.

Example 1

A test was performed to measure ammonia ($NH_3$) emissions and nitrogen oxide ($NO_x$) emissions from a comparative system and systems of the invention. A comparative system containing a three-way catalyst (TWC) was compared with a system including a three-way catalyst and an $NH_3$ oxidation catalyst (TWC-AOC system), according to one embodiment of the present invention, and a system including a three-way catalyst and a multi-layer $NH_3$ oxidation catalyst system containing an ammonia slip catalyst (TWC-ASC), according to another embodiment of the present invention. The multi-layer $NH_3$ oxidation catalyst system included a first layer (i.e., top-layer) of a small pore molecular sieve supported transition metal catalyst and a second layer (under-layer) of a platinum group metal catalyst. Specifically, Cu/SAPO-34 was used as the top-layer and platinum was used as the under-layer of the multi-layer $NH_3$ oxidation catalyst. In particular, the catalyst layers were coated along the walls of a flow-through substrate, with the second layer being coated on the substrate first and the first layer being coated over the second layer.

The space velocity of the gas flow was 100,000 $hr^{-1}$ at the TWC catalyst and 50,000 $hr^{-1}$ at the $NH_3$ oxidation catalyst. The exhaust gas at the inlet to the TWC catalyst comprised: 1410 ppm $C_3H_8$ as $C_1$, 0.45% CO, 0.15% $H_2$, 2700 ppm NO, 0.25% $O_2$, 10% $CO_2$, 10% $H_2O$, with the balance comprising $N_2$. The lambda value of the exhaust gas at the TWC catalyst was calculated as 0.9905, while the lambda value of the gas at the $NH_3$ oxidation catalyst, after the injection of the oxygen-containing gas, was calculated as about 1.022. 0.5% oxygen was added as part of the oxygen-containing gas. A platinum-supported coated monolith substrate was utilized.

Figure 2:
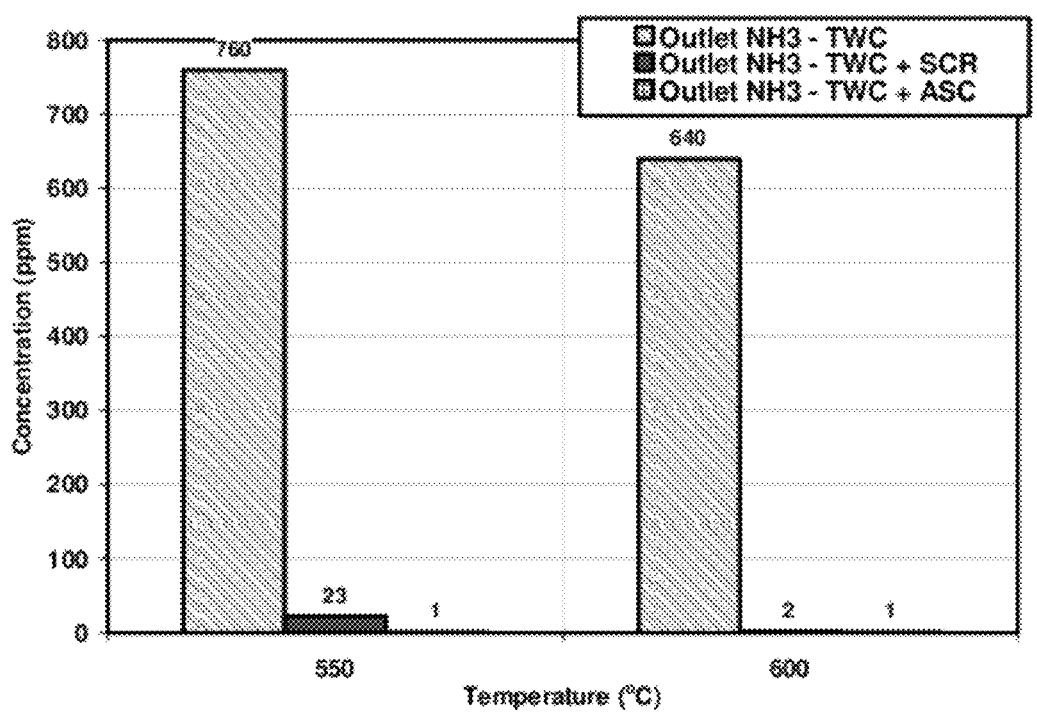
FIG. 2 is a bar graph showing ammonia ($NH_3$) emissions, at 550° C. and 600° C., from a three-way catalyst (TWC) system, a three-way catalyst and $NH_3$ oxidation catalyst (TWC-AOC) system according to one embodiment of the present invention, and a three-way catalyst and multi-layer $NH_3$ oxidation catalyst system containing an ammonia slip catalyst (TWC-ASC) according to another embodiment of the present invention.
Figure 3:
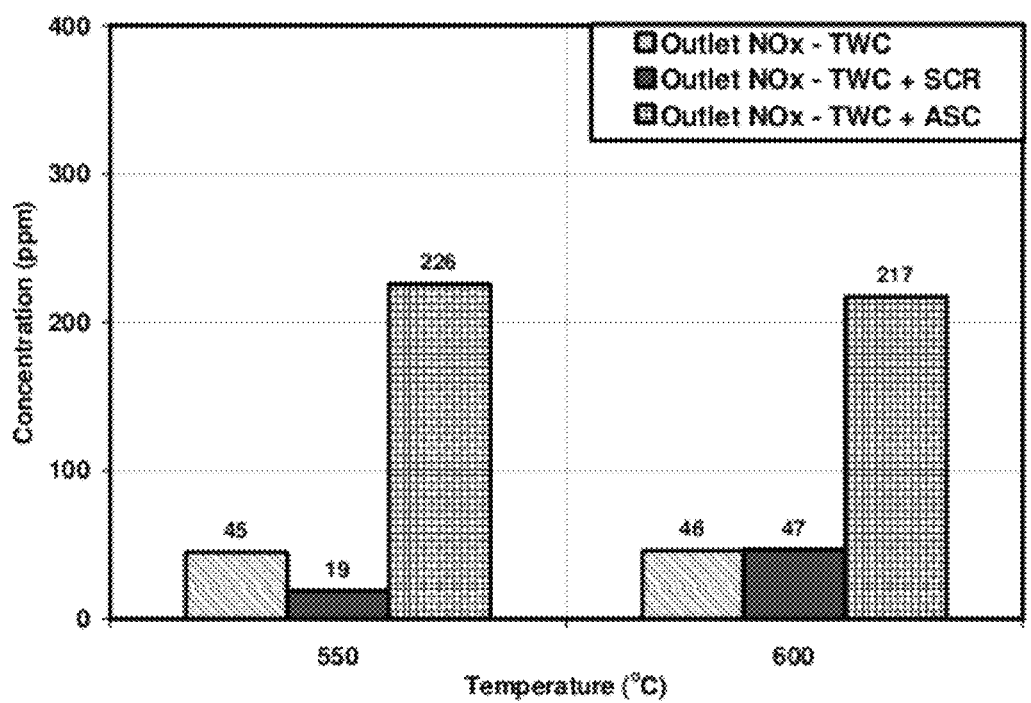
FIG. 3 is a bar graph showing nitrogen oxide ($NO_x$) emissions, at 550° C. and 600° C., from the three systems mentioned in the description of FIG. 2.

FIG. 2 shows $NH_3$ emissions from the three systems, at 550° C. and 600° C. Similarly, FIG. 3 shows NO emissions from the three systems, at 550° C. and 600° C. As seen in FIGS. 2 and 3, both the TWC-AOC system and the TWC-ASC system are capable of significantly reducing outlet $NH_3$ to below 30 ppm, but only the $NH_3$ oxidation catalyst (i.e., the single layer small pore molecular sieve supported transition metal catalyst) of the TWC-AOC system reduces or maintains the outlet NO concentration. The multi-layer $NH_3$ oxidation catalyst (i.e., the top-layer small pore molecular sieve supported transition metal catalyst and under-layer of a platinum group metal catalyst) of the TWC-ASC system resulted in a 200 ppm increase in $NO_x$. This is because some of the $NH_3$ reaches the platinum group metal under-layer catalyst (i.e., ASC catalyst) and becomes oxidized to NO by some oxidizing agents present in the gas as it contacts the under-layer catalyst. This effect may be minimized by a higher top-layer loading of the exchanged molecular sieve, for example, with a top-layer loading containing from about 0.1 to about 20.0 wt % copper, preferably from about 0.1 to about 10.0 wt % copper, and most preferably from 0.1 wt % to about 6.0 wt % copper to the total weight of the catalyst. In addition, the TWC-ASC system would be more suitable for gases in which the potential for oxidation is less.

Example 2

A test was performed to compare the effect of transition metal loading on the emission reduction capabilities of the small pore molecular sieve catalyst. Copper was employed as the transition metal. A comparative system containing a three-way catalyst (TWC) was compared with a system according to the invention including a three-way catalyst and $NH_3$ oxidation catalyst (TWC-AOC system) having a 2.5% copper loading and a system according to the invention including a three-way catalyst and a three-way catalyst and $NH_3$ oxidation catalyst (TWC-AOC system) having a 4.2% copper loading. Specifically, Cu/SAPO-34 is used as the $NH_3$ oxidation catalyst.

The space velocity of the gas flow was 100,000 $hr^{-1}$ at the TWC catalyst and 50,000 $hr^{-1}$ at the $NH_3$ oxidation catalyst. The exhaust gas at the inlet to the TWC catalyst comprised: 1410 ppm $C_3H_8$ as $C_1$, 0.45% CO, 0.15% $H_2$, 2700 ppm NO, 0.25% $O_2$, 10% $CO_2$, 10% $H_2O$, with the balance comprising $N_2$. The lambda value of the exhaust gas at the TWC catalyst was calculated as 0.9905, while the lambda value of the gas at the $NH_3$ oxidation catalyst, after the injection of the oxygen-containing gas, was calculated as about 1.022. 0.5% oxygen was added as part of the oxygen-containing gas. A platinum-supported coated monolith substrate was utilized.

Figure 4:
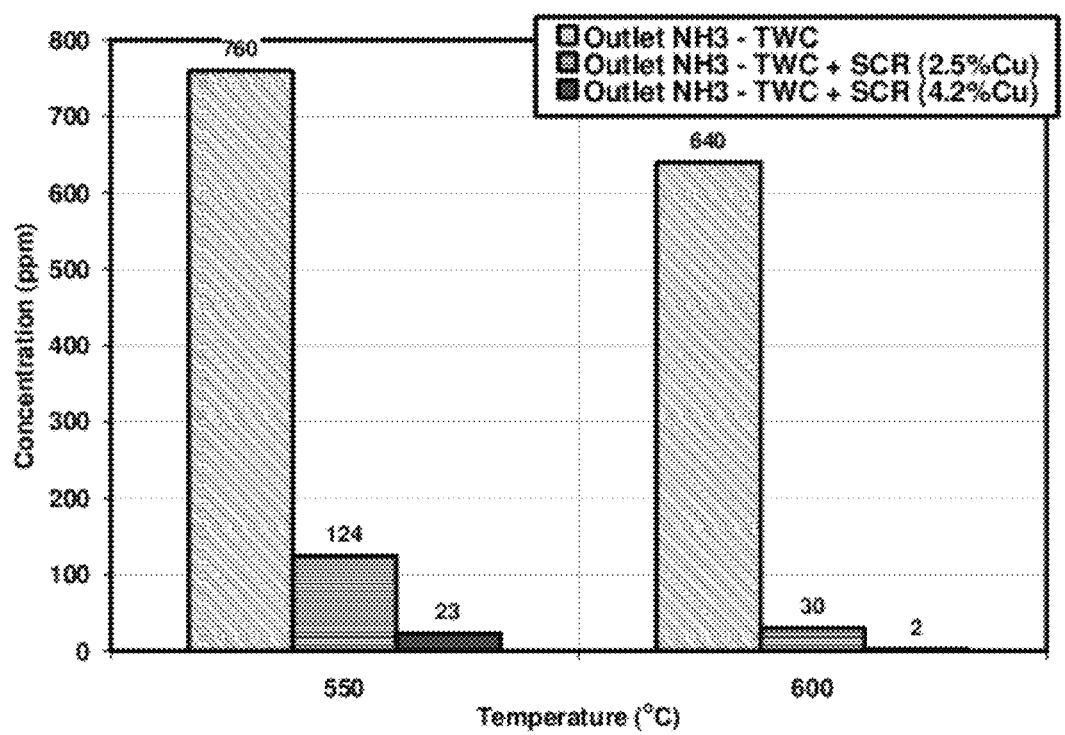
FIG. 4 is a bar graph showing ammonia ($NH_3$) emissions, at 550° C. and 600° C., from a TWC system, a TWC-AOC system having a copper loading of 2.5% according to one embodiment of the present invention, and a TWC-AOC system having a copper loading of 4.2% according to another embodiment of the present invention.
Figure 5:
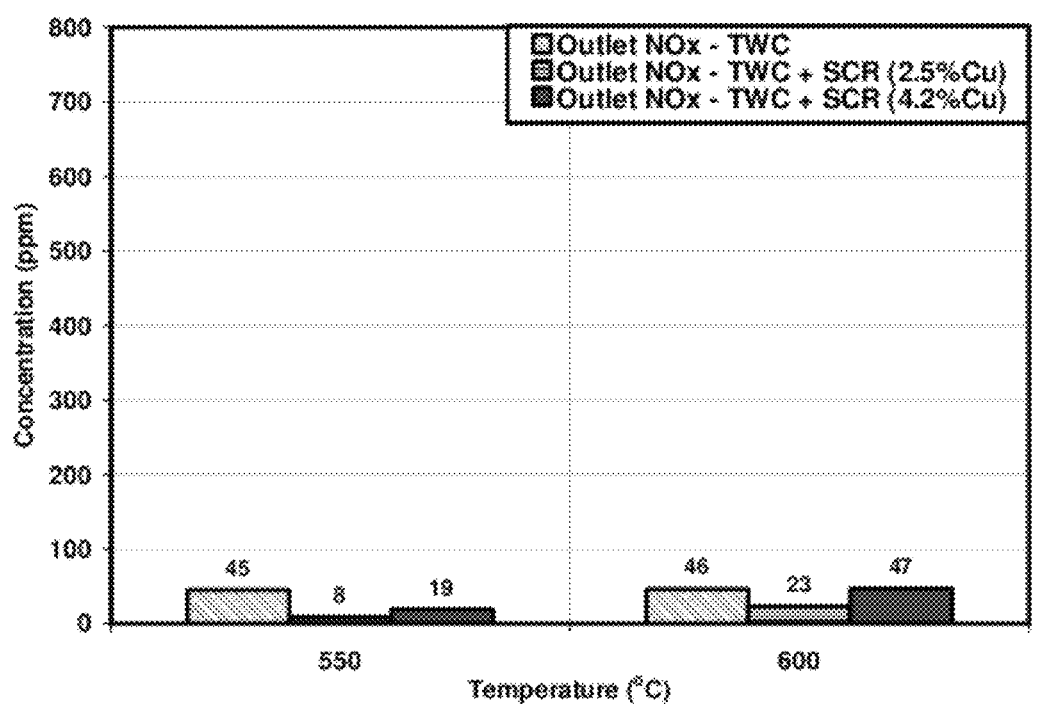
FIG. 5 is a bar graph showing nitrogen oxide ($NO_x$) emissions, at 550° C. and 600° C., from the three systems mentioned in the description of FIG. 4.

FIG. 4 shows $NH_3$ emissions while FIG. 5 shows $NO_x$ emissions from these systems, at 550° C. and 600° C. As seen in FIGS. 4 and 5, higher copper loadings resulted in improved $NH_3$ oxidation with additional $NO_x$ slip compared to the comparative TWC system. It was identified that excess free copper can increase $NO_x$ slip. In some systems, a certain amount of $NO_x$ slip is tolerable; in those systems, one of ordinary skill in the art could readily balance the benefits of additional free copper catalyst (e.g., prevent hydrothermal degradation of the nitrogen oxide conversion of the catalyst) with the increased, but still tolerable, amount of $NO_x$ slip.

Example 3

A test was performed to compare the effect of temperature on emission reduction capabilities of the small pore molecular sieve catalyst. Copper was employed as the transition metal. A comparative system containing a three-way catalyst (TWC) was compared with a system according to the invention including a three-way catalyst and $NH_3$ oxidation catalyst (TWC-AOC system) having a 4.2% copper loading. Specifically, Cu/SAPO-34 is used as the $NH_3$ oxidation catalyst.

The space velocity of the gas flow was 100,000 $hr^{-1}$ at the TWC catalyst and 50,000 $hr^{-1}$ at the $NH_3$ oxidation catalyst.

The exhaust gas at the inlet to the TWC catalyst comprised: 1410 ppm $C_3H_8$ as $C_1$, 0.45% CO, 0.15% $H_2$, 2700 ppm NO, 0.25% $O_2$, 10% $CO_2$, 10% $H_2O$, with the balance comprising $N_2$. The lambda value of the exhaust gas at the TWC catalyst was calculated as 0.9905, while the lambda value of the gas at the $NH_3$ oxidation catalyst, after the injection of the oxygen-containing gas, was calculated as about 1.022. 0.5% oxygen was added as part of the oxygen-containing gas. A platinum-supported coated monolith substrate was utilized.

Figure 6:
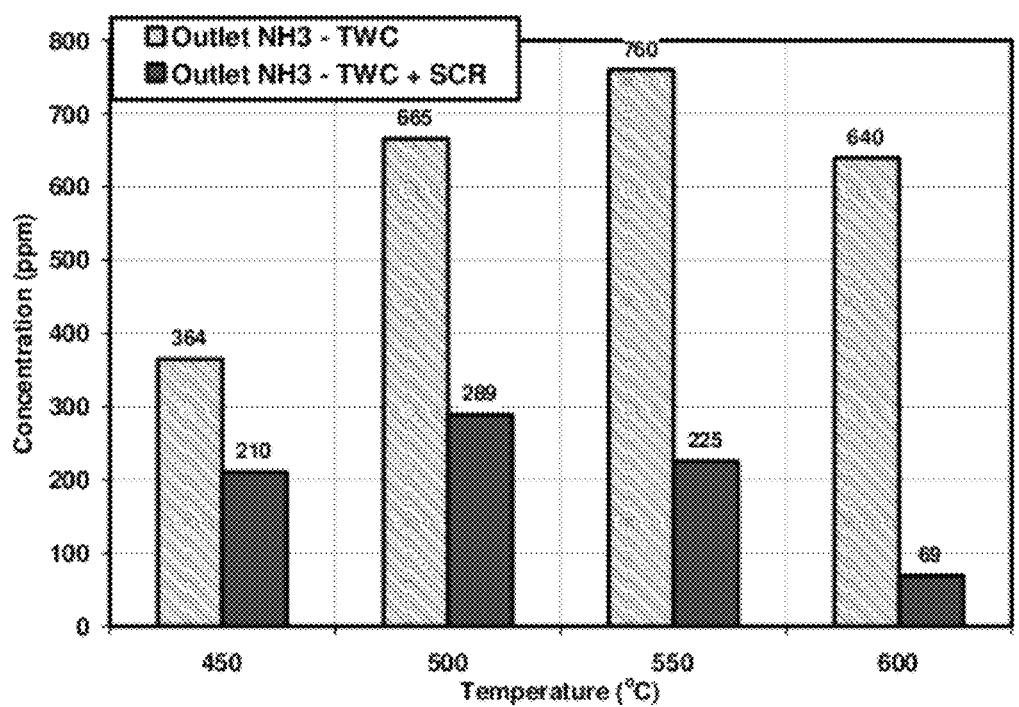
FIG. 6 is a bar graph showing ammonia ($NH_3$) emissions, at temperatures of 450° C., 500° C., 550° C., and 600° C., from a TWC system and a TWC-AOC system which employs Cu/SAPO-34 with a copper loading of 4.2% as the AOC catalyst, according to another embodiment of the present invention.
Figure 7:
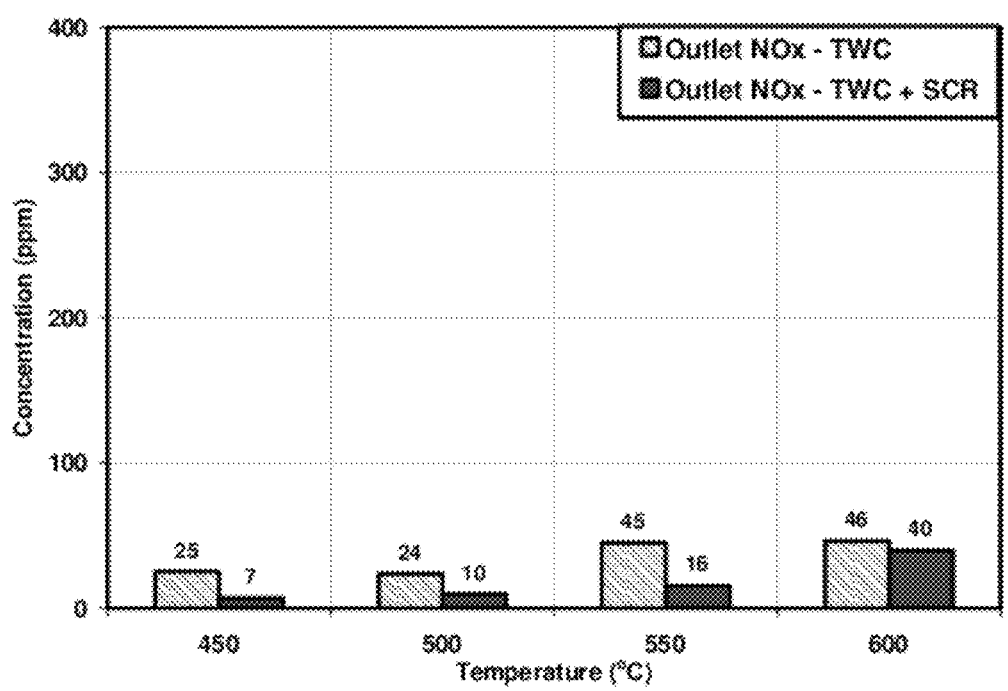
FIG. 7 is a bar graph showing nitrogen oxide ($NO_x$) emissions, at temperatures of 450° C., 500° C., 550° C., and 600° C., from the two systems mentioned in the description of FIG. 6.

FIG. 6 shows $NH_3$ emissions while FIG. 7 shows $NO_x$ emissions from these systems, at 450° C., 500° C., 550° C., and 600° C. As seen in FIGS. 6 and 7, the $NH_3$ oxidation catalysts are capable of significantly reducing outlet $NH_3$ even at higher temperatures, while also reducing $NO_x$ emissions.

Accordingly, small pore molecular sieves supporting with transition metals (i.e., small pore molecular sieves supported transition metal) are durable to long-term, high temperature agings required for rich-burn applications and are highly selective in converting $NH_3$ to $N_2$ under high temperature, low oxygen conditions. Existing systems and catalysts in rich-burn conditions typically result in significant $NH_3$ slip and are not effective at high temperatures.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A system for reducing ammonia (NH3) emissions comprising:
    (a) a first component comprising a first substrate and a three-way catalyst disposed thereon, wherein the first component is disposed upstream of, and in fluid communication with, a second component comprising a second substrate and an ammonia oxidation catalyst disposed thereon, wherein said ammonia oxidation catalyst has a first catalyst layer which comprises a small pore molecular sieve supporting at least one transition metal and wherein the first catalyst layer excludes ruthenium (Ru), rhodium (Rh), palladium (Pd), rhenium (Re), iridium (Ir) and platinum (Pt); and
    (b) an oxygen-containing gas input disposed between said first and second components.

2. The system of claim 1 further comprising:
    (c) a first gaseous feed stream comprising exhaust gas derived from a rich-burn combustion process, wherein said feed stream is upstream of, and in fluid communication with, the first component; and
    (d) a conduit disposed between, and in fluid communication with, the first and second components and in fluid communication with said oxygen-containing gas input.

3. The system of claim 2 wherein said oxygen-containing gas input comprises a second gaseous feed stream.

4. The system of claim 1, wherein the small pore molecular sieve is selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-alunninophosphate (SAPO) molecular sieves, and metal substituted silico-aluminophosphate (MeAPSO) molecular sieves, and mixtures thereof.

5. The system of claim 1, wherein the small pore molecular sieve is selected from the group of Framework Types consisting of CHA, LEV, ERI, AEI, UFI, and DDR, and mixtures and/or intergrowths thereof.

6. The system of claim 1, wherein the small pore molecular sieve comprises a CHA Framework Type.

7. The system of claim 1, wherein the at least one transition metal is selected from the group consisting of chromium (Cr), cerium (Ce), manganese (Mn), iron (Fe), cobalt (Co), nickel (Ni), and copper (Cu), and mixtures thereof.

8. The system of claim 1, wherein the small pore molecular sieve supporting the at least one transition metal is a Cu-supported CHA Framework Type.

9. The system of claim 1, wherein the ammonia oxidation catalyst further comprises a second catalyst layer comprising a platinum group metal, wherein the first catalyst layer is disposed relative to the second catalyst layer such that the exhaust contacts the first catalyst layer before contacting the second catalyst layer.

10. The system of claim 9, wherein the platinum group metal is selected from the group consisting of ruthenium (Ru), rhodium (Rh), palladium (Pd), rhenium (Re), iridium (Ir) and platinum (Pt), and mixtures thereof.

11. The system of claim 9, wherein the small pore molecular sieve supporting the at least one transition metal in the first catalyst layer is a Cu-supported CHA Framework Type and the platinum group metal in the second catalyst layer is platinum (Pt).

12. A method for reducing ammonia ($NH_3$) emission comprising:
    introducing an oxygen-containing gas into a gas stream having $NH_3$ and a lambda <1 to provide an oxygenated gas stream; and
    exposing the oxygenated gas stream to an $NH_3$ oxidation catalyst comprising at least one small pore molecular sieve supporting at least one transition metal to selectively oxidize at least a portion of the $NH_3$ to $N_2$, wherein the at least one transition metal excludes ruthenium (Ru), rhodium (Rh), palladium (Pd), rhenium (Re), iridium (Ir) and platinum (Pt).

13. The method of claim 12 further comprising, upstream of the step of introducing an oxygen-containing gas, the step of:
    exposing a rich burn exhaust gas to a three-way catalyst for converting nitrogen oxides ($NO_x$), hydrocarbons (HC), and carbon monoxide (CO) to produce the gas stream having $NH_3$ and a lambda <1.

14. The method of claim 13, wherein the rich burn exhaust gas has a temperature in the range from about 400-650° C.

15. The method of claim 12, wherein the oxygen-containing gas is introduced to produce an oxygenated gas stream having an $O_2$:$NH_3$ ratio from about 2:1 to about 1:1.

16. A catalyst article comprising:
    (a) a catalyst composition having a first catalyst layer comprising (i) a small pore molecular sieve comprising a framework defining pores and having atomic sites; and (ii) at least one transition metal in atomic form disposed at least one of said atomic sites and in oxide form residing freely in at least one of said pores, wherein the first catalyst layer excludes ruthenium (Ru), rhodium (Rh), palladium (Pd), rhenium (Re), iridium (Ir) and platinum (Pt); and
    (b) a substrate upon which said catalyst is disposed, wherein said catalyst article is adapted to oxidize ammonia generated by catalytic conversion of a rich burn exhaust gas.

17. The catalyst article of claim 16, wherein the small pore molecular sieve is a copper (Cu) supported small pore molecular sieve having from about 0.1 to about 20.0 wt % copper to the total weight of the catalyst.

18. The catalyst of claim 16, wherein the catalyst composition further comprises a second catalyst layer comprising a platinum group metal, wherein the first catalyst layer is disposed upon the second catalyst layer.

19. The catalyst of claim 18, wherein the small pore molecular sieve is a copper (Cu) supported small pore molecular sieve having from about 0.2 to about 4 wt % copper to the total weight of the catalyst.

* * * * *